United States Patent [19]
Elesh

[11] 3,831,557
[45] Aug. 27, 1974

[54] CAT LITTER BOX

[76] Inventor: James N. Elesh, 40 Sportsman's Hill Rd., Madison, Conn. 06443

[22] Filed: Jan. 24, 1973

[21] Appl. No.: 326,244

Related U.S. Application Data

[63] Continuation-in-part of Ser. No. 218,295, Jan. 17, 1972, abandoned.

[52] U.S. Cl. ............................................. 119/1
[51] Int. Cl............................................. A01k 01/00
[58] Field of Search ....................................... 119/1

[56] References Cited
UNITED STATES PATENTS

| | | | |
|---|---|---|---|
| 3,428,967 | 2/1969 | Hughes | 4/142 |
| 3,484,875 | 12/1969 | Eisenberg | 4/142 |
| 3,579,655 | 5/1971 | Sundberg | 4/116 |
| 3,600,719 | 8/1971 | Karr | 4/116 |
| 3,737,920 | 6/1973 | Savee | 4/116 |
| 3,771,493 | 11/1973 | Chandor | 119/1 |

Primary Examiner—Russell R. Kinsey
Attorney, Agent, or Firm—William A. Snow; Charles W. Rummler

[57] ABSTRACT

A one-piece molded sanitary cat box of hexagonal-like vertical cross section having a disposable linear and an integrally hinged splatter shielding cover with sides slanted upwardly and inwardly to keep the cat from dislodging the filler material and daily waste outwardly of the box per se, and containing deflector flanges extending inwardly from the top edges of the shield to return the material in the box away from the inner edges thereof, the box and cover containing a mating joint to anchor a free end of a disposable liner for the box and arranged to prevent the filler material and daily waste from entering the joint.

6 Claims, 15 Drawing Figures

PATENTED AUG 27 1974 3,831,557
SHEET 1 OF 3
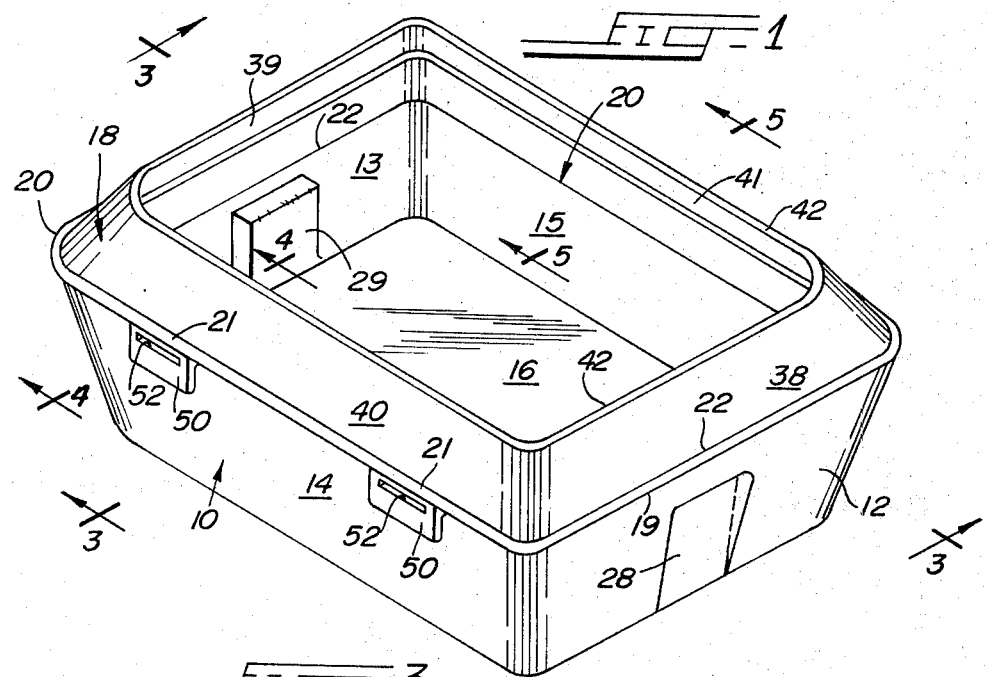
FIG. 1
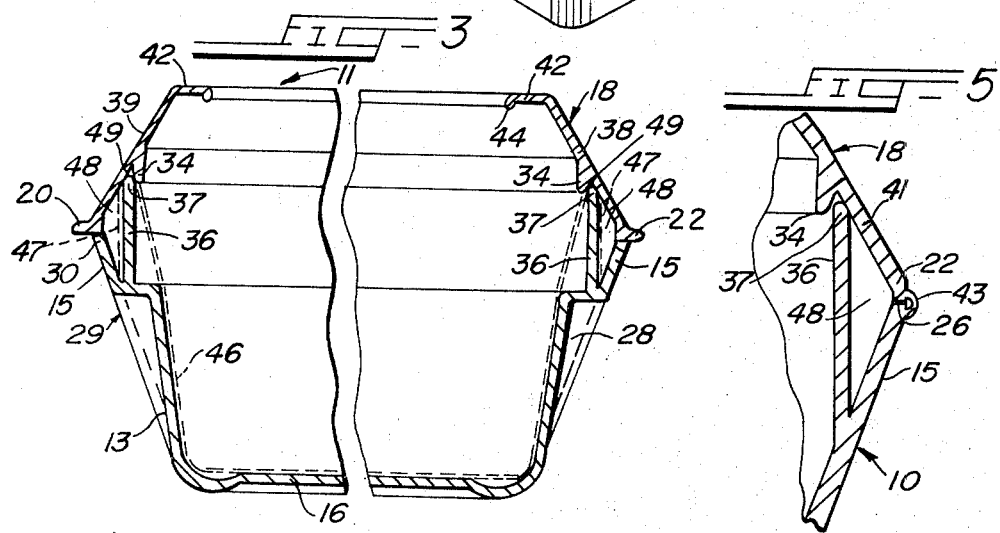
FIG. 3
FIG. 5
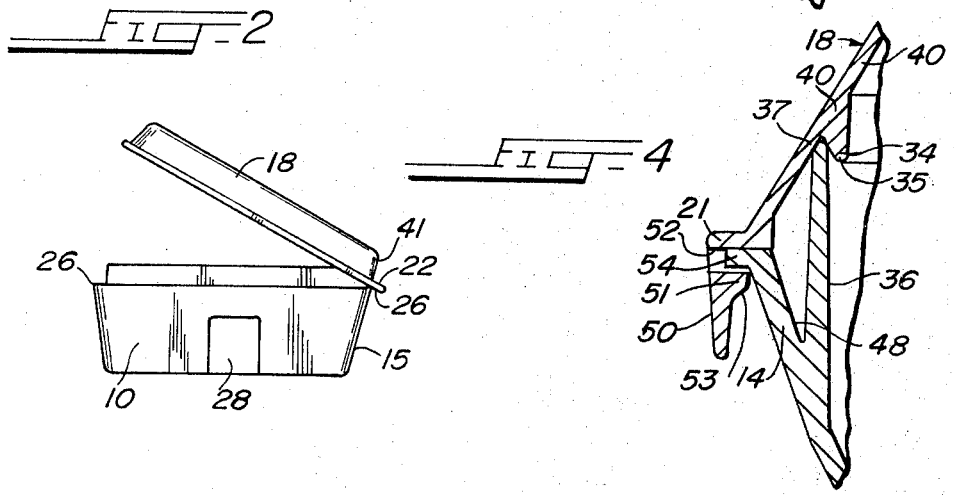
FIG. 2
FIG. 4

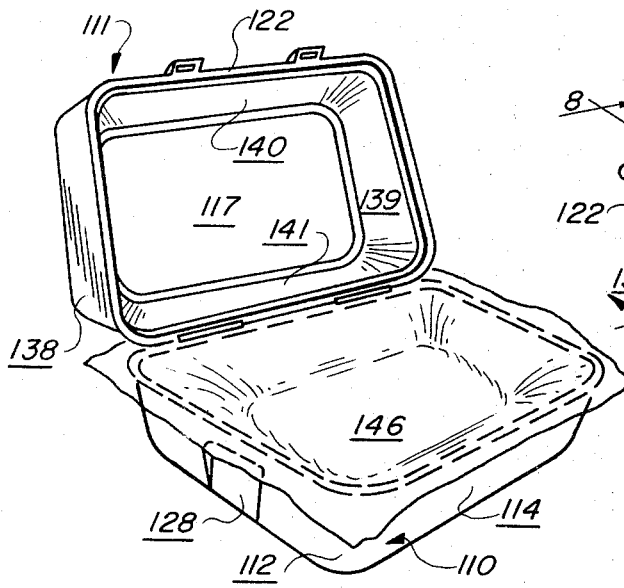
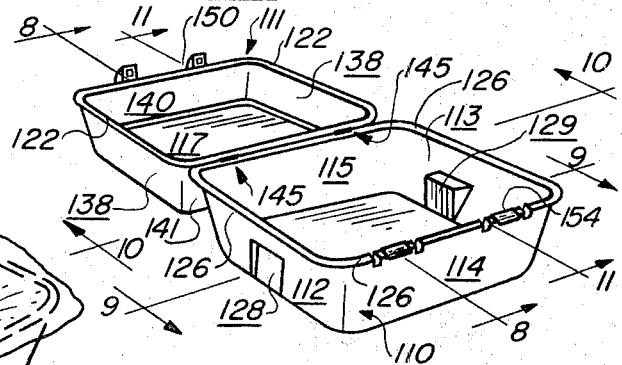
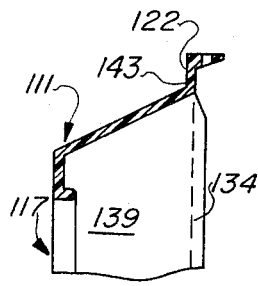
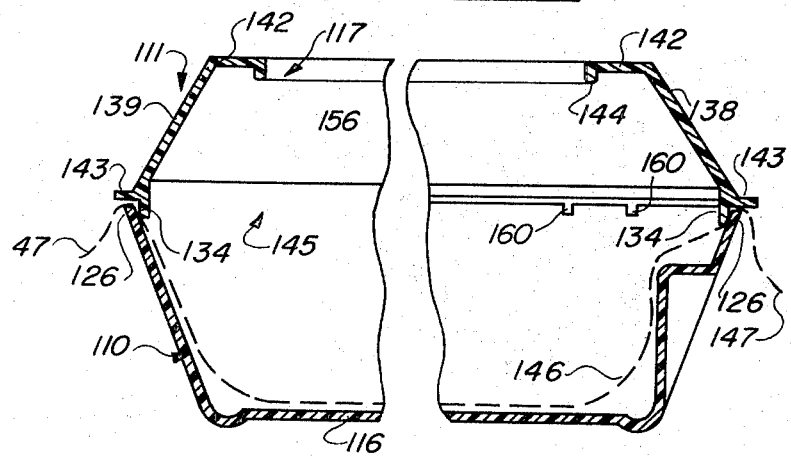
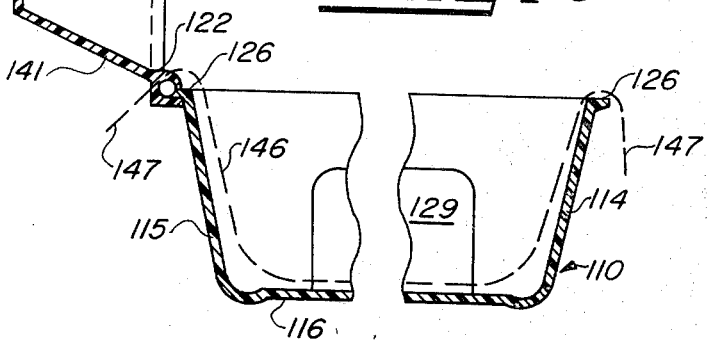

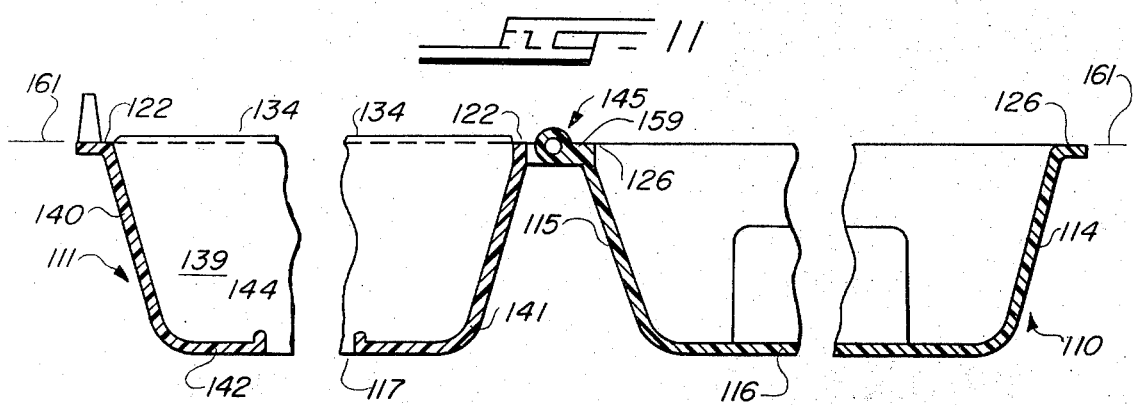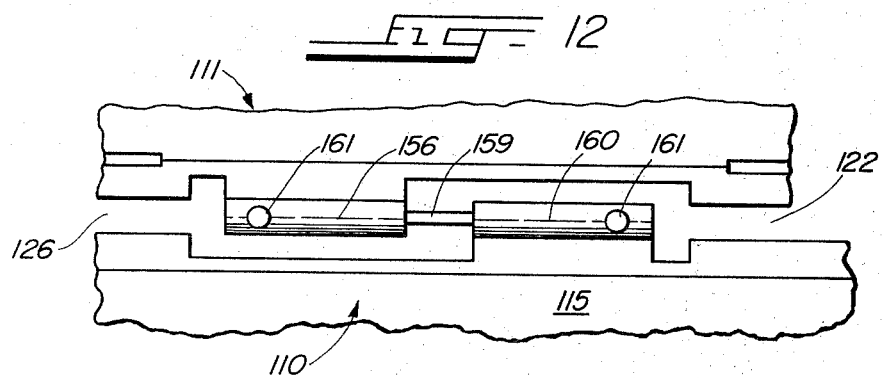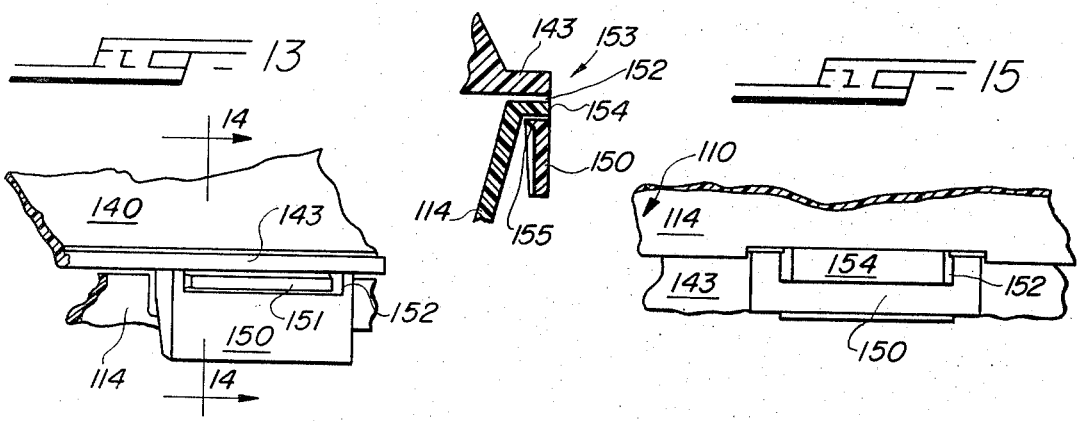

CAT LITTER BOX

CROSS REFERENCE TO RELATED APPLICATION

This application is a continuation-in-part of a parent application titled CAT LITTER BOX filed Jan. 17, 1972, Ser. No. 218,295 and now abandoned.

BACKGROUND OF THE INVENTION

Cats are often kept in apartments and homes without having the opportunity of going outdoors for their normal daily care. To overcome this difficulty, the owner usually provides a box or pan containing a filler, such as sand, sawdust or a loose material prepared specifically for this purpose, which functions as a deodorant and an absorbent. A plain box or pan is normally unsatisfactory for this purpose, since the cat usually scratches and digs in the filler material both before and after he has used the box and consequently throws and scatters the filler material over the sides of the box onto the floor. Further, the cat, in using the box, occasionally places himself in such a position near the sides of the box that the waste is not discharged or lodged in the filler material or even in the box, thus making it impossible for the cat to cover the waste in the normal manner.

The only conventional cat litter box known to me, other than the ordinary pan, is a two-piece material-retaining structure with a cover mounted directly on top of the pan which is substantially the same size, with tongued edges seating in a U-shaped groove structure attached to the upper edges of the sides and ends of the pan, and extending completely around the periphery thereof. The outside edge of the groove structure in the pan extends somewhat above the upper edge of the inside edge of the sides in order to facilitate assembling the cover on the pan, and the upper edge is rolled over to provide a smooth entering surface. A basic problem with this conventional litter box is that litter escaping from the box tends to deposit in the U-shaped groove for holding the cover in place and clogs it up so that the cover will not squarely seat when it is assembled on the pan. The two-piece construction also multiplies the number of molded parts which must be handled on a mass production basis, making a costly assembly. The above structure is shown in Lowe U.S. Pat. No. 3,310,031 to a Sanitary Cat Box.

Other prior art is the Sundberg U.S. Pat. No. 3,579,655 to a Portable Toilet and Sink Structure and the Like which renders obvious the hinging of the cover to the pan of Hughes U.S. Pat. No. 3,428,967 to a Child's Chamber Pot. Hughes discloses a two-piece material-retaining structure with a cover mounted directly on top of the pan which is substantially the same size with a flat peripheral flange on the pan and a peripheral flange with a downward-facing annular recess therein for mating therewith on the cover and a disposable liner with a peripheral part overlying said flange and clamped thereon by the cover. A basic problem with this chamber pot structure as applied to the cat litter box art is that litter is not prevented from escaping from the pot if it were used as a box by a deep open re-entrant cover with side walls which converge upward to a flat peripherally-beaded, inwardly-extending flange surrounding the open litter area. Hughes' cover flange construction also does not have a peripheral baffle element depending from the cover adjacent to the interior horizontal flat juncture between the flat peripheral flange on the pan and the downward-facing annular recess on the peripheral flange on the cover to prevent filler material in the pan from entering the joint when the cover is closed on the pan. The two-piece construction also multiplies the number of molded parts and makes them more costly.

Eisenberg U.S. Pat. No. 3,484,875 to a Collapsible Portable Commode discloses a two-piece material-retaining structure with a cover mounted directly on top of the pan with tongued edges seating in a U-shaped groove in the under side of the cover and extending completely around the periphery thereof. The outside edge of the groove structure in the cover and the inside edge of the sides are beveled in order to facilitate assembling the cover on the pan. A basic problem with this commode structure as applied to the cat litter box art is that the litter is not prevented from escaping from the commode if it were used as a box by a deep open re-entrant cover with side walls which converge upward to a flat peripherally-beaded, inwardly-extending flange surrounding the open litter area. The two-piece construction is also costly.

Karr U.S. Pat. No. 3,600,719 to a Portable Collapsible Commode discloses a three-piece material-retaining structure with a cover mounted on the top of the pan which has a removable bottom. The pan is open at the top with the bottom attached and is foldable between an open operative and a flat stored position. A basic problem with this commode structure as applied to the cat litter box art is that though the litter is prevented from escaping from the commode if it were used as a box by a deep re-entrant cover with a broad, flat, peripherally-beaded, inwardly-extending flange surrounding an open commode area, the open area in the cover is so much restricted in its access to the commode below that it is doubtful that a cat would find such a commode to his (or her) littering satisfaction, and as such would absolutely refuse to enter such a commode as a litter box and scratch and dig in his usual manner in performing his daily routine. As a cat litter box, Karr's patent to a commode completely lacks utility.

There is therefore an established need to provide a one-piece litter box for use by the cat in his normal daily care which permits the cat to dig and scratch the filler material before and after using the box in the normal and usual manner without scattering or throwing the material from the box so designed that the waste will be discharged onto or within the filler material and away from the sides or ends of the box and the upper edges of the pan for seating the cover incorporating a baffle seal for preventing litter from escaping from the box.

SUMMARY OF THE INVENTION

The gist of this invention concerns a cat litter box which has a deep re-entrant cover for the pan with an opening in the top which is large enough for the cat to enter the interior of the box to take care of its daily requirements. Side walls of the cover are convergent upward to a flat, inwardly-extending, peripheral-beaded flange which surrounds the opening to an enclosed litter area below. The cover side walls terminate at their downward extremity in flat sealing edges surrounding the litter area. These edges bear on the upper peripheral edges of the pan when the cover is on the box and have a downwardly-depending rib therefrom which extends below the upper edges of the pan. The cover forms an effective shield preventing the expulsion of filler material and cat daily waste normally in the bottom of the box when the cat scratches and digs therein in the normal manner.

The cover and pan are hinged together at the back hinges on a common hinge axis. Snap-locks connect the front juncture of the cover and pan in the closed position along the front thereof. A disposable liner for said pan having a peripheral overlap which extends outwardly over the pan edge is secured in position against the upper peripheral edge of the pan by the flat seal edge on the cover upon closure of the cover on the pan.

In one version, the hinge axis lies along the line of intersection of the two planes formed by the upper and lower edges of the pan and cover of the box when in the partially open position. The pan and cover assembly of this cat litter box, including the hinge at the juncture of the backs thereof, can then be molded as a single unit. A common parting plane for the mold passes along the upper edge of the pan and across the flat sealing surface of the cover when it is laid open from the pan and extends through the centerline of the hinge therebetween.

BRIEF DESCRIPTION OF THE DRAWINGS

FIG. 1 is a perspective view of the cat litter box of my invention;

FIG. 2 is an end elevational view thereof with the shield partially opened on the hinge on the pan for cleaning and removal or insertion of a disposable liner;

FIG. 3 is a fragmentary cross-sectional view taken along the lines 3—3 of FIG. 1;

FIG. 4 is an enlarged fragmentary cross-sectional view through the side at the snap-lock of the box along the lines 4—4 of FIG. 1;

FIG. 5 is an enlarged fragmentary cross-sectional view taken on the lines 5—5 of FIG. 1;

FIG. 6 is a perspective view of a modified box of my invention with the cover partially opened;

FIG. 7 is a perspective view thereof with the cover fully opened with the disposable liner removed;

FIG. 8 is a fragmentary cross-sectional view through the hinge and snap-lock on the rear and the front of the box, respectively, taken along the lines 8—8 of FIG. 7;

FIG. 9 is a fragmentary cross-sectional view taken along the lines 9—9 of FIG. 7 with the tang removed for clarity;

FIG. 10 is a fragmentary cross-sectional view taken along the lines 10—10 of FIG. 7 but showing the cover on the pan;

FIG. 11 is a fragmentary cross-sectional view of the hinge and snap-lock on the rear and the front of the box, respectively, taken along the lines 11—11 of FIG. 7 showing the parting line of the mold;

FIG. 12 is an enlarged fragmentary top plan view of the hinge and pin connecting the cover and pan of the box with parts broken away;

FIG. 13 is an enlarged fragmentary perspective front view of the snap-lock on the box;

FIG. 14 is an enlarged fragmentary cross-sectional view of the snap-lock on the box; and FIG. 15 is an enlarged fragmentary bottom view of the snap-lock on the box.

DETAILED DESCRIPTION OF THE DRAWINGS

Referring to FIGS. 1, 3, 4 and 5, the cat litter box, preferably constructed of polyprophylene by molding, comprises a one-piece pan 10 having an open cover 11, end walls 12 and 13, a front wall 14 and a rear wall 15 connected to the end walls 12 and 13, respectively, and a bottom panel 16 integrally formed on the lower ends of the walls 12, 13, 14 and 15, respectively. The walls 12, 13, 14 and 15 all diverge upwardly and outwardly from the edges of the bottom panel 16. Carrying handles 28 and 29 are molded in the end walls 12 and 13, respectively, for easy transportation.

An open top cover shield 18 is integrally formed in one piece with the pan 10. The shield has end walls 38 and 39, a front wall 40 and a rear wall 41. Each of these walls slants upwardly and inwardly when closed on the pan. A hinge element 43 is integrally made a part of the free edge 26 of wall 15 and the free edge 22 of wall 41, thus making the cover and pan a unitary construction having a hexagonal-like shape in vertical cross section.

The upper free ends of walls 38, 39, 40 and 41 are provided with integrally-formed, inwardly-extending right angled flanges 42, the free ends of which are provided with downwardly-extending rounded elements 44.

The walls 38, 39, 40 and 41 slant upwardly and inwardly from the free edges of the walls 12, 13, 14 and 15 whereby they, with the inwardly-extending peripheral flange 42, form effective baffles to retain the filler material in the pan when the cat is scratching or digging preparatory to and after using the pan 10.

As clearly shown in FIGS. 4 and 5, a downwardly-extending depending short cover rib 34 is peripherally formed on the inside surface of the walls 38, 39, 40 and 41. An upwardly-extending pan rib 36 is peripherally formed on the inside surface of walls 12, 13, 14 and 15 and the upper free end thereof nestles in seat 49 of rib 34. This seating creates a peripheral groove pocket 48.

A disposable liner 46, shown in broken lines in FIG. 3, is shaped to generally conform to the inside contour of pan 10 and has an overlap edge 47 which folds over the peripheral edge 37 of the pan rib 36 and any surplus seats in the peripheral groove pocket 48, thus supporting the liner in the pan and concealing the surplus of the overlap in the pocket. The liner is held in position in the box by the closing of the cover whereby the peripheral edge 37 with the overlap portion 47 disposed thereover will be held in seat 49. The liner lies against the inside face of walls 12, 13, 14 and 15. The free edge of the cover walls 12, 13 and 14 is each provided with an outwardly-extending flange 19, 20 and 21, respectively, against which the free edges of the pan walls 12, 13 and 14 seat.

A pair of snap locks secures the cover and pan together. Each lock comprises a depending tang 50 mounted to the lower face of the flange 21 and having a relatively short inwardly-projecting portion 51 adjacent the upper end thereof and spaced therefrom to form a catch 52. As shown in FIG. 4, a portion of the inner face of the tang has diagonally downwardly-extending guide wall 53. The upper end of wall 14 is provided with a latch arm 54 which extends outwardly from the outer upper end of wall 14 medially of the ends thereof. When the cover is closed, the latch 54 will be guided into catch 52 by the inner wall of the tang 50 and the diagonal guide 53 and lock the cover to the pan and thereby lock the liner in place.

The upper edges of walls 12, 13 and 14 seat against the cover face of flanges 19, 20 and 21, respectively, on the lower free edges of walls 38, 39 and 40 of cover 18.

The hinge 43 extends the length of walls 15 and 41. Two locks (51–52) are shown and described herein but it is understood that one lock may be provided if desired to lock the cover to the pan. Also, since the box is preferably made of polypropylene or a similar material, the wall 14 will slightly shift inwardly to allow the latch 54 to move over the portion 51 and assist in seating the latch 54 in the catch 52. To open the box, the tang 50 is pulled to the left, as shown in FIG. 4, and upwardly.

Referring to the embodiment shown in FIGS. 6 and 7, the cat litter box is preferably constructed of polyprophylene or a similar plastic by molding and comprises a one-piece pan 110 having an open top 111, end walls 112 and 113, a front wall 114 and a rear wall 115 connected to the end walls 112 and 113, respectively, and a bottom panel 116 integrally formed on the lower ends of the walls 112, 113, 114 and 115, respectively. An opening 117 in top 111 is large enough for a cat to enter the interior of the box to take care of its daily requirements. The walls 112, 113, 114 and 115 all diverge upwardly and outwardly from the edges of the bottom panel 116 as in the embodiment of FIGS. 1 to 5 and terminate in a peripheral free edge 126. Carrying handles 128 and 129 are molded in the end walls 112 and 113, respectively, for easy transportation.

The cover 111 is integrally formed by molding in one piece with the pan 10. The cover 111 has end walls 138 and 139, a front wall 140 and a rear wall 141. Each of these walls slants upwardly and inwardly when closed on the pan and terminates in a peripheral free edge 122. A hinge 145 is integrally molded as a part of the free edge 126 of the wall 115 and also integrally a part of the free edge 122 of the wall 141, as shown in FIG. 8, thus making the cover and pan a single unit assembly.

The upper portions of walls 138, 139, 140 and 141 of cover 111 are provided with inwardly-extending, flat, horizontal flanges 142 (see FIG. 10), the inner free ends of which are provided with downwardly-extending beads 144, as shown in FIGS. 9 and 10. The free edges of the cover walls also have the outwardly-extending horizontal flange 143 against which the free edges 126 of the pan walls 112, 113 and 114 seat. The walls 138, 139, 140 and 141 of the cover 111 slant upwardly and inwardly from an outwardly-extending, flat, horizontal flange 143 which lies at the line of juncture between the peripheral edges 126 of the pan 110 and the peripheral edges 122 of the cover 111, whereby they, with the inwardly-extending peripheral flange 142, form an effective cover shield to retain the filler material in the pan when the cat is scratching or digging preparatory to and after using the litter box.

As shown in FIGS. 8, 9 and 10, a downwardly-extending depending rib 134 is peripherally formed on the inside surface of the walls 138, 139 and 141 of the cover 111 for overlapping the horizontal juncture between the pan 110 and the cover 111 when the box is closed. There is no depending rib on front wall 140, nor adjacent the hinges 145.

A disposable liner 146, shown in FIG. 6 and in broken lines in FIGS. 8, 9 and 10, is shaped to generally conform to the inside contour of pan 10 and has an overlap edge 147 which folds over the peripheral edges 126 of the pan 110, thus supporting the liner in the pan. The liner is held in position in the box by the closing of the cover whereby the overlap 147 is clamped between the peripheral edge 126 and the horizontal flange 143 of the peripheral edge 122 and the depending rib 134. The liner lies against the inside face of walls 112, 113, 114 and 115 of the pan 110.

With the liner in place, the bottom thereof is usually covered with a commercial treated material which has both a sanitary and an absorbent quality.

A pair of snap-locks 153 spaced along the flange 143 on the front wall 140 secures the cover 11 and pan 10 together at the front walls 140 and 114, respectively, as shown in FIGS. 7, 9 and 13. Each lock 153 comprises a depending tang 150 having a horizontally-disposed, rectangularly-slotted catch 152 therein mounted to the lower face of the horizontal flange 143 along the front wall 140, as shown in FIG. 13. A latch arm 154 projects outwardly adjacent the upper end thereof of wall 114 and spaced therefrom to form a catch 152, as shown in FIGS. 7, 10 and 14. As shown in FIG. 14, a portion of the inner face of the tang 150 has diagonally downwardly-extending guide wall 155. When the cover 111 is closed, the tang 150 will be guided into catch 152 by the inner guide wall 115 of the tang 150, as shown in FIG. 15, and locks the cover 111 to the pan 110 with the liner 146 clamped therebetween. As seen in FIGS. 7 and 13, the upper edge of wall 114 is provided with slots 160 to provide a seat for the inner face of wall 155.

Two locks 153 are shown and described herein but it is understood that one lock may be provided if desired to lock the cover to the pan. Also, since the box is preferably made of polyprophylene or other similar plastic material, the wall 114 will slightly shift inwardly to allow the latch 154 to spring over the portion 151 and assist in seating the tang 150 in the catch 152. To open the box, the tang 150 is pulled to the right, as shown in FIG. 14, and upwardly.

The edge 126 of the pan 110 seats against the cover flanges 143 along the front wall 114 and the two side walls 112 and 113, respectively, as shown in FIGS. 9 and 10.

A pair of spaced hinges 145 which are spaced along the juncture of rear walls 115 and 141 of the cover 111 and the pan 110, respectively, as shown in FIG. 7, are molded as one assembly with the cover and pan. Hinges 145 each comprise a cover hinge lug 156 which has a molded-in horizontal hinge pin 159 and which is integrally molded to lower edge 122 of cover wall 141, as shown in FIG. 12. One end of the hinge pin 159 is molded in place on the hinge axis of lug 156 and extends outward therefrom. A pan hinge lug 160 is also integrally molded to the upper edge 126 of pan wall 115. The opposite end of the hinge pin 159 is also molded in place on the coaxial extension of the axis of the hinge lug 156. As seen in the drawings, the lugs 159 and 156 are spaced from each other.

Reference to FIG. 11 shows the cover 11 hinged to the pan 10 by the hinge 143 having the hinge pin 159. Opened in the as-molded position, the edges 126 of the walls 112, 113, 114 and 115 of the pan 10, the edges 122 of the walls 138, 139, 140 and 141 of the cover 111 and the axis hinge pins all fall in a common parting plane 161 for the mold.

With the liner in place, the bottom thereof is usually covered with a commercial treated material which has both a sanitary and an absorbent quality.

The opening in cover 11 and 17 is large enough for a cat to enter the interior of the box to take care of its daily requirements.

It will be understood that details of the invention described may be altered or omitted without departing from the spirit of the invention as defined by the following claims.

I claim:

1. A cat litter box of single-piece, injection-molded plastic construction comprising:
   a. a pan having front, rear and end walls and a bottom, said walls extending from said bottom terminating in four edges falling in a horizontal plane;
   b. a disposable liner within said pan having an overlapping edge supported by the edges of the walls of said pan;
   c. an open cover for said pan having front, rear and end walls extending upwardly and inwardly when said cover is positioned on said pan, the lower ends of said wall edges falling in a horizontal plane when said cover is closed on the pan, the upper edges of each of said walls having an integrally-formed, inwardly-extending flange;
   d. a hinge means connecting the rear walls of the pan and the cover; and
   e. lock means for securing the front edges of the cover and the pan.

2. A cat litter box as set forth in claim 1 wherein the rib means comprises:
   a. a rib extending upward from the rear and opposed end walls of said pan and nesting within and adjacent to and shielding the juncture of the four edges of the cover and the pan; and
   b. a rib depending from the rear and opposed end walls of said cover and nesting within and adjacent to and overlapping the upward-extending rib from the cover.

3. A cat litter box as set forth in claim 1 wherein the free edges of the front and end walls of the pan comprise flat horizontal mating surfaces.

4. A cat litter box as set forth in claim 1 wherein the edges of the front and end walls of the cover comprise flat mating surfaces in the same plane.

5. A cat litter box as set forth in claim 1 wherein said hinge means comprises:
   a. a pair of spaced pan hinge lugs mounted on the rear edge of the pan having a hinge axis falling along the line of intersection of the plane containing the said edges of the cover with the horizontal plane containing the said edges of the pan when the cover is partially open thereon;
   b. a hinge pin rotatably mounted in the pan hinge lug coincident with the axis of the pan hinge lug; and
   c. a pair of spaced cover hinge lugs mounted on the rear edge of the cover each adjacent to a pan hinge lug and having its hinge axis falling along the hinge axis of the pan hinge lug and rotatably mounted on the hinge pin.

6. A cat litter box of single-piece plastic construction comprising an open pan having end walls, a front wall and a rear wall, and a bottom panel, carrying handles molded in said end walls, an open-top cover for said pan having end walls, a front wall and a rear wall, said cover walls each slanting inwardly and upwardly and partially over said pan when the cover is positioned on said pan, an outwardly-extending peripheral flange integrally formed on the lower free edges of said front and end walls of said cover a peripheral flanged element integrally formed on the upper free edges of said pan walls and extending towards each other to form baffles, a hinge element connected to the free edge of said rear pan wall and the lower free edge of said rear wall of said cover, a short rib peripherally mounted on the inside of the walls of the cover, a pan rib peripherally mounted on the inside walls of the pan and adjacent to said pan walls and extending upwardly into said cover and the free edge thereof seating in said cover rib, a disposable liner having an overlap portion disposed in said pan, said overlap portion extending over the free edge of said pan rib to support the liner in the pan, a snap lock comprising a tang depending from said flange on said front wall of said cover having a catch thereon, and a latch formed on the upper free edge of the front wall of said pan to secure the cover to the pan in the closed position.

* * * * *